(12) United States Patent
Liu

(10) Patent No.: US 7,500,748 B1
(45) Date of Patent: Mar. 10, 2009

(54) SPECTACLES CAPABLE OF MAGNIFYING AN IMAGE DISPLAYED ON A PORTABLE MULTIMEDIA PLAYER

(76) Inventor: Keng-Yuan Liu, 8F.-2, No. 6, Lane 609, Sec. 5, Chongxin Rd., Sanchong City, Taipei County (TW) 241

( * ) Notice: Subject to any disclaimer, the term of this patent is extended or adjusted under 35 U.S.C. 154(b) by 0 days.

(21) Appl. No.: 12/114,795

(22) Filed: May 4, 2008

(51) Int. Cl.
*G02C 1/00* (2006.01)
(52) U.S. Cl. .......................................... 351/158; 351/41
(58) Field of Classification Search .................. 351/158, 351/41, 45, 46, 49, 51, 52
See application file for complete search history.

(56) References Cited

U.S. PATENT DOCUMENTS 5,521,654 A * 5/1996 Bertieri ........................ 351/46

* cited by examiner

*Primary Examiner*—Hung X Dang
(74) *Attorney, Agent, or Firm*—WPAT, P.C.; Anthony King

(57) ABSTRACT

A pair of spectacles capable of magnifying an image displayed on a portable multimedia player includes a front frame having a slot vertically extended between an upper and a lower surface thereof; a magnifying unit being arranged at a rear side of the front frame to face toward an open back of the slot; and two temples being separately located at two lateral sides of the front frame. When a user wears the spectacles with the portable multimedia player placed in the slot to orient a screen thereof toward the magnifying unit, the image displayed on the screen is magnified and can be clearly viewed by the user.

3 Claims, 3 Drawing Sheets

SPECTACLES CAPABLE OF MAGNIFYING AN IMAGE DISPLAYED ON A PORTABLE MULTIMEDIA PLAYER

FIELD OF THE INVENTION

The present invention relates to a pair of spectacles capable of magnifying an image on a portable multimedia player, and more particularly to a pair of spectacles having a magnifying unit for magnifying an image displayed on a screen of a portable multimedia player, so that a wearer may clearly view the magnified image.

BACKGROUND OF THE INVENTION

The currently available portable multimedia player generally includes a case, a central processing unit mounted in the case, and a storage unit, a power supply unit, a display screen, and a plurality of control keys electrically connected to the central processing unit. The display screen and the plurality of control keys are externally located at on the case. With these arrangements, a user may conveniently carry the portable multimedia player about for playing back music and image at any time and at any place.

The portable multimedia player is not only characterized by its function of playing sounds and images, but also by its compactness and light weight, which enables a user to conveniently carry the portable multimedia player about. To enable a compact and light-weight portable multimedia player, the size of the display screen on the player is inevitable reduced. As a result, the image shown on the small-size display screen has lowered definition and tends to hazard the user's eyes.

SUMMARY OF THE INVENTION

A primary object of the present invention is to provide a pair of spectacles that can be worn by a user to clearly view a magnified image being displayed on a portable multimedia player connected to the spectacles.

To achieve the above and other objects, the spectacles include a front frame having a slot vertically extended between an upper and a lower surface thereof; a magnifying unit being arranged at a rear side of the front frame to face toward an open back of the slot; and two temples being separately located at two lateral sides of the front frame.

When a user wears the spectacles with a portable multimedia player placed in the slot and orienting a screen thereof toward the magnifying unit, the image displayed on the screen is magnified by the magnifying unit and can therefore be clearly viewed by the user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
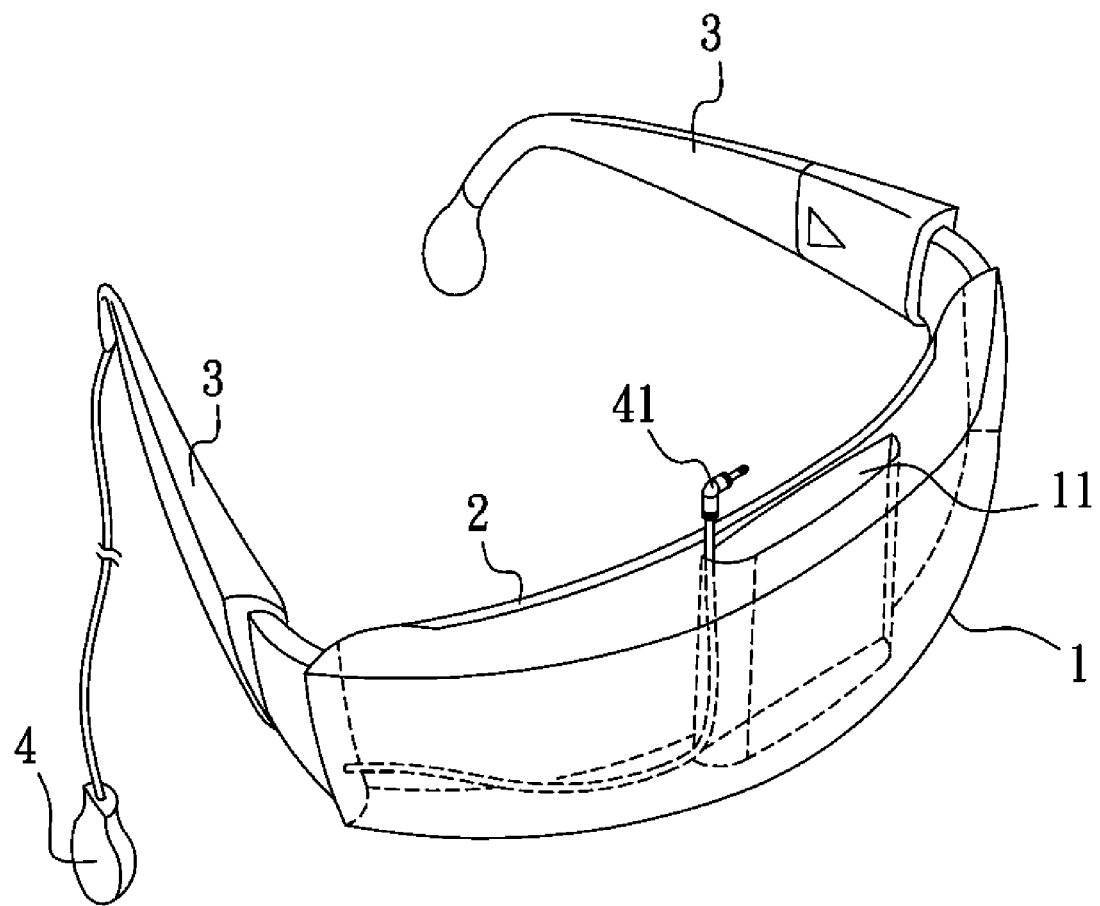
FIG. 1 is a perspective view of a pair of spectacles of the present invention capable of magnifying an image displayed on a portable multimedia player.

Please refer to FIG. 1 that is a perspective view of a pair of spectacles of the present invention capable of magnifying an image displayed on a portable multimedia player. As shown, the spectacles of the present invention include a front frame 1, a magnifying unit 2, and two temples 3.

The front frame 1 has a slot 11 vertically extended between an upper and a lower surface thereof.

The magnifying unit 2 is arranged at a rear side of the front frame 1 to face toward an open back of the slot 11. The magnifying unit 2 may be a magnifying lens.

The temples 3 are separately located at two lateral sides of the front frame 1. At least one of the two temples 3 is provided with an earphone 4. A plug 41 is distantly connected to the earphone 4 via a cord, and is extended into the slot 11.

Figure 2:
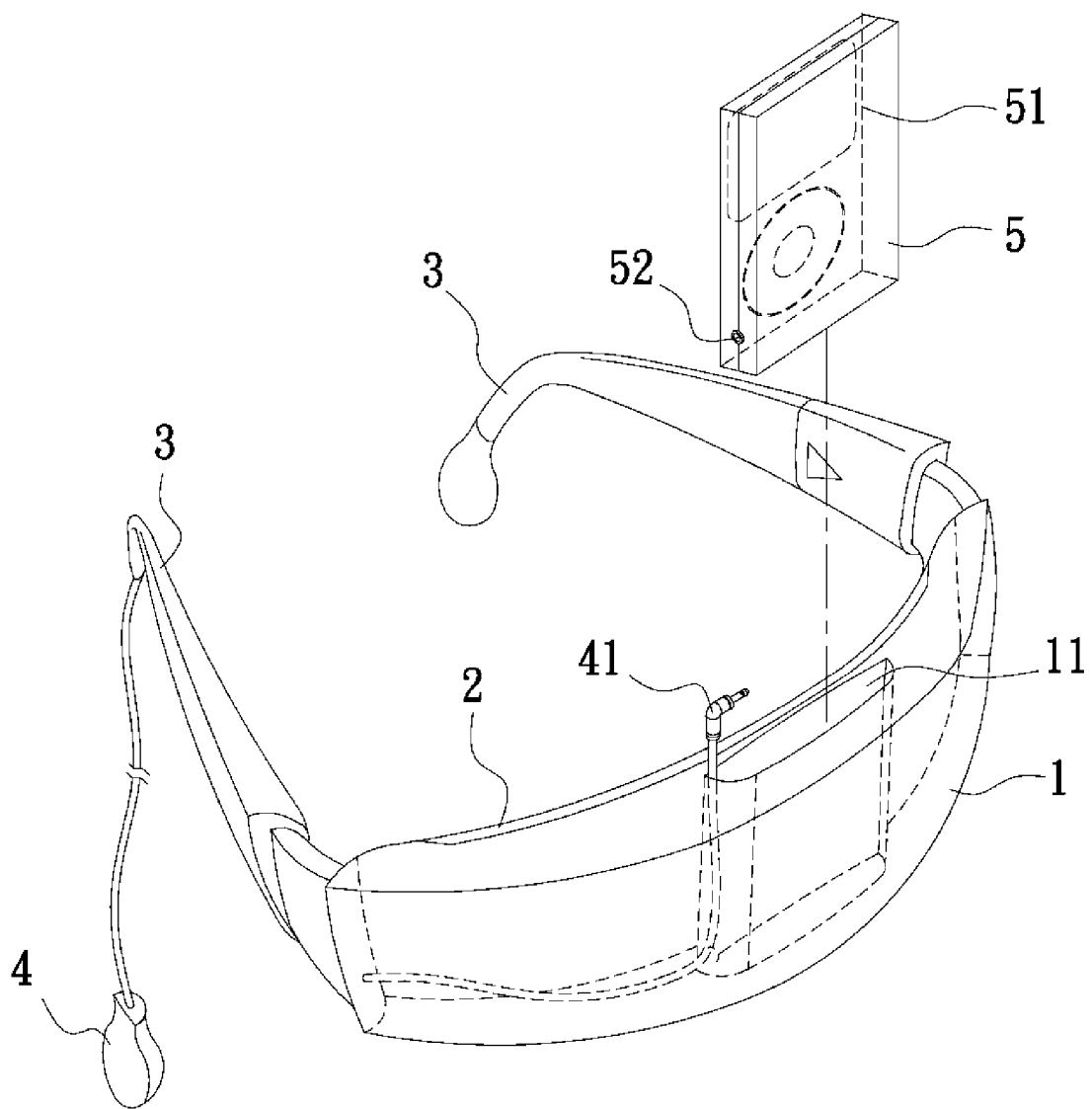
FIG. 2 shows the manner of connecting a portable multimedia player to the spectacles of the present invention.
Figure 3:
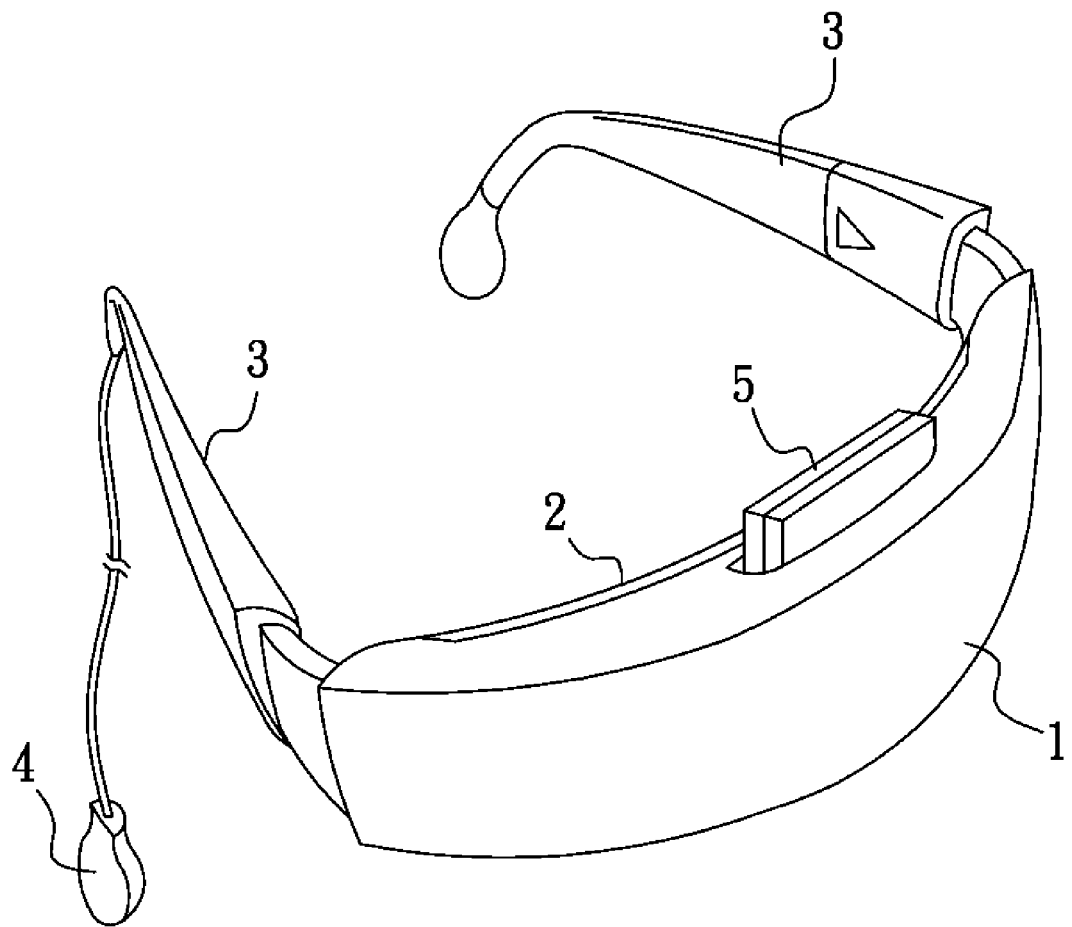
FIG. 3 shows the spectacles of the present invention with the portable multimedia player connected thereto.

Please refer to FIG. 2 that is an exploded perspective view showing the manner of connecting a portable multimedia player 5 to the spectacles of the present invention, and to FIG. 3 that is an assembled perspective view of the spectacles of the present invention with the portable multimedia player 5 inserted in the slot 11. When it is desired to magnify an image displayed on the portable multimedia player 5 for viewing clearly, a user may simply place the portable multimedia player 5 in the slot 11 with a screen 51 on the portable multimedia player 5 facing toward the magnifying unit 2, and then wear the spectacles with the temples 3 rested on the user's two ears. Then, the image displayed on the screen 51 of the portable multimedia player 5 is magnified by the magnifying unit 2 and can be clearly viewed.

While viewing the magnified image, the user may directly utilize an earphone (not shown) provided with the portable multimedia player 5 to enable sound transmission. Alternatively, the user may connect the plug 41 of the earphone 4 provided on the temple 3 to a jack 52 on the portable multimedia player 5 before placing the latter in the slot 11. In this manner, sound transmission may be achieved via the earphone 4 on the temple 3 to meet actual need in using the portable multimedia player 5.

With the spectacles of the present invention, the portable multimedia player 5 may be placed on the front frame 1 to locate in front of the magnifying unit 2, so that a user wearing the spectacles may clearly view a magnified image being displayed on the portable multimedia player 5. Therefore, the present invention is improved and practical for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A pair of spectacles capable of magnifying an image displayed on a portable multimedia player, comprising:
   a front frame having a slot vertically extended between an upper and a lower surface thereof to slidably receive the portable multimedia player within the slot;

a magnifying unit being arranged at a rear side of the front frame to face toward an open back of the slot;
a plug disposed in the slot to electronically couple to the portable multimedia player; and
two temples being separately located at two lateral sides of the front frame.

2. The spectacles as claimed in claim 1, wherein the magnifying unit is a magnifying lens.

3. The spectacles as claimed in claim 1, further comprising an earphone being provided on at least one of the two temples, and the plug being distantly connected to the earphone via a cord and extended into the slot.

\* \* \* \* \*